United States Patent [19]

Shimizu et al.

[11] Patent Number: 4,950,707
[45] Date of Patent: Aug. 21, 1990

[54] POLYETHER END-BLOCKED WITH HYDROLYZABLE SILYL GROUPS, METHOD OF MANUFACTURING AND ROOM TEMPERATURE CURABLE COMPOSITION USING THE POLYETHER

[75] Inventors: Chiyuki Shimizu; Tamio Yoshida, both of Ohta, Japan

[73] Assignee: Toshiba Silicone Co., Ltd., Japan

[21] Appl. No.: 340,938

[22] Filed: Apr. 20, 1989

Related U.S. Application Data

[62] Division of Ser. No. 103,621, Oct. 1, 1987, Pat. No. 4,847,357.

[51] Int. Cl.$^5$ .............................. C08L 81/02
[52] U.S. Cl. ............................. 524/609; 528/30; 528/374; 528/377
[58] Field of Search ............... 524/609; 528/374, 377, 528/30

[56] References Cited

U.S. PATENT DOCUMENTS 4,847,357  7/1989  Shimizu et al. ................. 528/374

Primary Examiner—Harold D. Anderson

[57] ABSTRACT

A polyether having molecular weight from 1,000 to 50,000, end-blocked with hydrolyzable silyl groups and represented by the general formula (P):

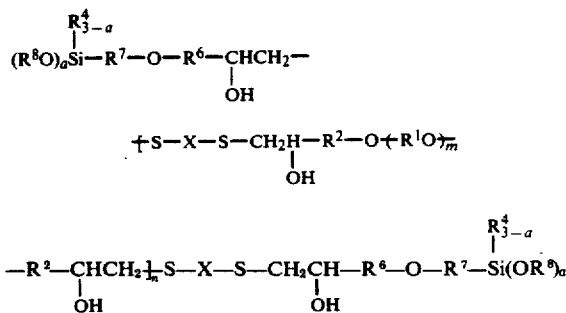

where $R^1$, $R^2$, $R^6$ and $R^7$ individually represent a divalent hydrocarbon group, $R^4$ represents a monovalent hydrocarbon group, $R^8$ represents an alkyl group with 1 to 6 carbon atoms, X represents an aromatic or heterocyclic ring, a represents a number from 1 to 3, m represents a number from 10 to 500, n represents a number of 1 or greater is produced and utilized in room temperature curing compositions containing inorganic filler and curing catalyst. There is also disclosed a method for producing the above polyether by reacting polyoxyalkylene end-blocked with epoxy groups, dimercapto compound and organo silicon compound.

5 Claims, 1 Drawing Sheet

POLYETHER END-BLOCKED WITH HYDROLYZABLE SILYL GROUPS, METHOD OF MANUFACTURING AND ROOM TEMPERATURE CURABLE COMPOSITION USING THE POLYETHER

This application is a division of application Ser. No. 103,621, filed 10/1/87 now U.S. Pat. No. 4,847,357.

BACKGROUND OF THE INVENTION

This invention concerns a polyether end-blocked with hydrolyzable silyl groups that can be cured at room temperature into a rubber-like elastomer upon contact with moisture, and a method of manufacturing the same. This invention also relates to a room temperature curing composition comprising such a polyether as an ingredient. The room temperature curing composition cures to a rubbery elastomer having particularly good heat and weather resistance, and having good adhesion before cure with no residual tackiness on the surface after cure.

The room temperature curing composition of this invention, comprising the above polyether, is suitable for use as a sealant. Similar prior art polyethers as well as their use in sealants are well known as disclosed in Japanese Patent Publication Kokai No. 50-156599, etc. Sealants based on such polyethers have been employed for the joints of buildings or joining portions in transportation machines (Japanese Patent Publication Kokai No. 52-73998, etc.). However, since the prior art sealants of this type are poor in heat resistance and weather resistance, they are undesirable for use in the joints of building outer walls requiring weather resistance, or in joints exposed to a relatively high temperature, for example, certain joining portions in transportation machines. Further, since the sealants of this type have no substantial adhesive property, it is required to apply the sealant after primer treatment of the surface to be bonded. Additionally, since the surface of cured sealant remains tacky, there is a problem that dust or the like is liable to be stuck to the sealant.

This invention is for overcoming these problems and the object thereof is to provide a room temperature curing composition capable of curing to a rubbery elastomer having good heat and weather resistance, and having good adhesion before cure with no residual tackiness on the surface after cure. This invention further provides a polyester end-blocked with hydrolyzable silyl groups which is useful as a base polymer in sealants, as well as a process for producing such a polyether.

DETAILED DESCRIPTION OF THE INVENTION

Figure 1:
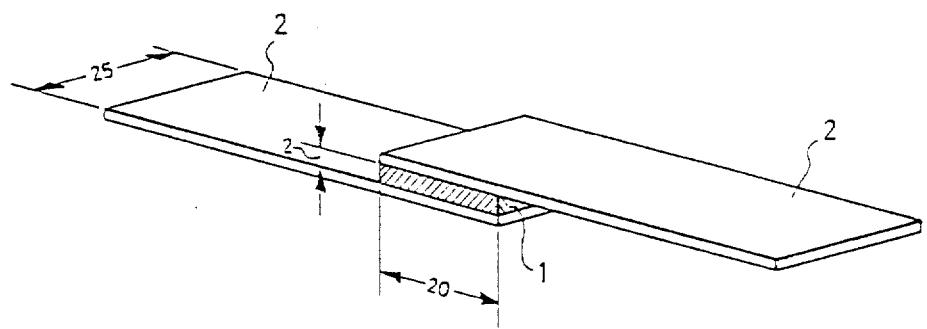
FIG. 1 is a perspective view of a specimen used for the shear resistance test. All of the units for values in the drawing are expressed in millimeters.
1 . . sample
2 . . adherend (glass, aluminum or polyvinyl chloride-coated steel plate)

This invention concerns a polyether having a molecular weight from 1,000 to 50,000 and end-blocked with hydrolyzable silyl groups represented by the general formula (P):

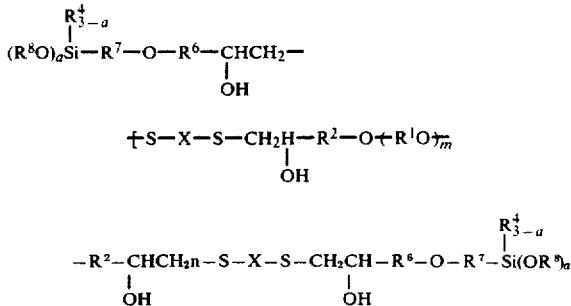

where $R^1$, $R^2$, $R^6$ and $R^7$ individually represent a divalent hydrocarbon group, $R^4$ represents a monovalent hydrocarbon group, $R^8$ represents an alkyl group with 1 to 6 carbon atoms, a represents a number from 1 to 3, m represents a number from 10 to 500, n represents a number of 1 or greater and X represents an aromatic or heterocyclic ring.

This invention also relates to a process for producing a polyether having a molecular weight from 1,000 to 50,000 and end-blocked with hydrolyzable silyl groups, by reacting:

(A) a polyoxyalkylene end-blocked with epoxy groups represented by the general formula:

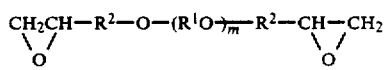

where $R^1$ and $R^2$ individually represent a divalent hydrocarbon group and m represents a number from 10 to 500, (B) a dimercapto compound represents by the general formula:

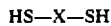

where X represents an aromatic or heterocyclic ring, and (C) an organo silicon compound having an epoxy group and hydrolyzable groups represented by the general formula:

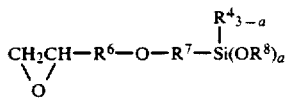

where $R^4$ represents a monovalent hydrocarbon group, $R^6$ and $R^7$ individually represent a divalent hydrocarbon group, $R^8$ represents an alkyl group with 1 to 6 carbon atoms and a represents a number from 1 to 3.

This invention further concerns a room temperature curable composition comprising:

(I) 100 parts by weight of a polyether having molecular weight from 1,000 to 50,000 end-blocked with hydrolyzable silyl groups and represented by the general formula (P), where P is as described above, (II) 3 to 300 parts by weight of inorganic filler and, (III) 0.001 to 20 parts by weight of a curing catalyst.

In the polyether according to this invention represented by the general formula (P), the oxyalkylene unit represented by $R^1O$ is preferably an oxyethylene unit, oxypropylene unit or a combined system of oxyethylene unit and oxypropylene unit. Oxypropylene unit is particularly preferred since the raw material is easily available, polymerization can be conducted easily and a liquid-state can be maintained readily even at a high degree of polymerization. The polymerization degree m for the oxyalkylene unit is selected from a range of 10 to 500. If m is less than 10, it is difficult to obtain a polyether capable of providing a rubber-like cured product having sufficient elongation or a polyether having a viscosity suitable for a practical processability level. On the other hand, if m is greater than 500, the heat resistance and the weather resistance of the elastomer obtained from the room temperature curable composition of this invention are poor.

As divalent hydrocarbon group $R^2$, there can be mentioned, for example, methylene group, ethylene group, trimethylene group, tetramethylene group, phenylene group, cyclohexylene group and the group represented by

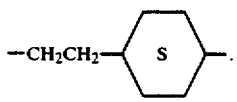

Among them, methylene group is preferred in view of the easy availability of the raw material.

It is necessary that X is an aromatic or heterocyclic ring for purposes of heat resistance and weather resistance. For the same reason, sulfur atoms in the —S—X—S— bond are preferably bonded to carbon atoms constituting X.

The monovalent hydrocarbon group $R^4$ can be selected from alkyl group, alkenyl group, aryl group, aralkyl group, etc. Methyl group, ethyl group, propyl group, butyl group, pentyl group, hexyl group, cyclohexyl group, vinyl group, allyl group, phenyl group and β-phenylethyl group are preferable in view of the ease of synthesis and availability of the raw material. Among them, methyl group is particularly preferred.

As $R^6$ and $R^7$, the divalent hydrocarbon groups of $R^2$ can be exemplified. $R^6$ is preferably methylene group in view of the availability of the raw material. $R^7$ is preferably ethylene group, trimethylene group or tetramethylene group, and trimethylene group is particularly preferred in view of the ease of synthesis and availability of the raw material. The alkyl group $R^8$ with 1 to 6 carbon atoms is preferably methyl group or ethyl group, particularly, methyl group since the hydrolyzability of the alkoxy group represented by $R^8O$-bonded to the silicon atom is high. The number a for the hydrolyzable groups is selected from the range of 1 to 3 and a is preferably 2 in order to obtain a rubber-like cured product with high elongation.

The polyether of this invention can be synthesized, for example, by reacting the epoxy groups in component (A) and (C) described above with the mercapto groups in component (B). Typical examples of component (A) include those prepared by condensing a polyoxyethylene or polyoxypropylene end-blocked with hydroxyl groups with epichlorohydrin in the presence of a basic catalyst. As component (B), 2,5-dimercapto-1,3,4-thiadiazole, dimercapto benzene, dimercapto toluene, dimercapto xylene and dimercapto naphthalene are recommended, because of the availability of the raw material, ease of the reactivity with epoxy groups, good yield and balance of the physical property of the polyether, etc. Among them, 2,5-dimercapto-1,3,4-thiadiazole is particularly preferred in view of the reason described above. Specific examples of component (C) are, β-glycidoxyethyltrimethoxysilane,
γ-glycidoxypropyltrimethoxysilane,
β-glycidoxyethyltriethoxysilane,
γ-glycidoxypropyltriethoxysilane,
methyl (β-glycidoxyethyl)dimethoxysilane,
methyl (γ-glycidoxypropyl)dimethoxysilane,
methyl (β-glycidoxyethyl)diethoxysilane,
methyl (γ-glycidoxypropyl)diethoxysilane,
phenyl (β-glycidoxyethyl)dimethoxysilane,
phenyl (γ-glycidoxypropyl)dimethoxysilane,
dimethyl (β-glycidoxyerthyl)methoxysilane, and
dimethyl (γ-glycidoxypropyl)methoxysilane.

The reaction of components (A), (B) and (C) is preferably carried out at a temperature higher than the ambient temperature, for example, under the condition from 50° to 150° C. In this case, it is preferred to use such a compound as methanol, ethanol, phenol, salicyclic acid, tris (dimethyl aminomethyl)phenol, benzyl methylamine, tributyl amine or 2-methyl imidazole as a reaction promotor. Methanol is a preferred example. Although the reaction can be carried out without solvent, hydrocarbon, ether, ester or other type solvent may be used.

The blending ratio of components (A), (B) and (C) is theoretically (A): (B): (C)=p: (P+1): 2 on a molar basis. However, components (B) and (C) may be used in a slight excess over the theoretical amount.

Components (A), (B) and (C) may be added simultaneously for reaction, but it is preferred to conduct the chain extension first by reacting component (A) with component (B). As stated before, the amount of component (B) is added in slight excess to component (A) on a molar basis to obtain the polyether within the desired molecular weight range. Then, the required or slightly excessive amount of component (C) is added and reacted. By this procedure the polymerization degree is easily controlled and the hydrolyzable groups can surely be introduced to the ends of the molecular chain.

Further, n is a number of 1 or greater and it should be selected so as to provide a molecular weight of the polyether of from 1000 to 50,000. When the polyether of this invention is used as a base polymer for a sealant, and the molecular weight is lower than 1000, then the elongation of the cured elastomer is insufficient as a sealant. While on the other hand, if the molecular weight is greater than 50,000, the viscosity of the base polymer is too high for good workability.

The ingredient (II) in the composition of this invention is to give the composition an appropriate non-flowing property and reinforcing property. The ingredient (II) may be exemplified by fumed silica, precipitated silica, pulverized silica, diatomaceous earth, calcium carbonate, titanium oxide, alumina, aluminum hydroxide, iron oxide, talc and clay. The inorganic fillers may have a surface treatment of organic silicon compounds, for example, trimethylchlorosilane, hexamethyldisilazane, hexamethylcyclotrisiloxane, octamethylcyclotetrasiloxane or silicone oil. The amount of ingredient (II) used is within a range from 3 to 300 parts by weight and, preferably from 5 to 200 parts by weight based on 100 parts by weight of ingredient (I). If the amount of ingredient (II) is less than 3 parts by weight, neither non-flowing property nor reinforcing property can be obtained. On the other hand, if it is greater than 300 parts by weight, the viscosity of the composition is increased to lower the workability.

The curing catalysts, as ingredient (III), used in this invention may be exemplified by thin carboxylates such as tin octylate; organo tin carboxylates such as dibutyl tin dilaurate, dibutyl tin dimaleate and dibutyl tin phthalate; organo tin oxides and reaction products thereof with esters; organic titanate such as tetrabutyl titanate; amines; amine salts; quarternary ammonium salts; guanidine derivatives, etc. The curing catalyst is preferably used within a range from 0.001 to 20 parts by weight based on 100 parts by weight of ingredient (I). If the amount of ingredient (III) is below the above specified range, the curing rate is too slow making the curing composition not suitable for use. While on the other hand, an excessive amount has no accelerating effect and results in the risk of bleeding or deposition.

Since the composition of this invention is self-adhering, there is no requirement for using silane coupling agents ordinarily employed for providing adhesion. It is, however, possible to use such agents for enhancing the bonding property, or to add hydrolyzable silanes to the composition with an aim of prolonging shelf-life of one package containers. The hydrolyzable silanes may be exemplified by $H_2N(CH_2)_3Si(OCH_3)_3$,
$H_2N(CH_2)_3Si(OCH_2CH_3)_3$,
$H_2N(CH_2)_3NH(CH_2)_3Si(OCH_3)_3$,

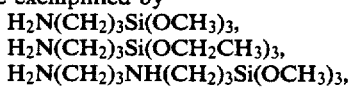

$CH_2=CHSi(OCH_2CH_3)_3$,
$(CH_3)_2Si(OCH_3)_2$,
$CH_3Si(OCH_3)_3$,
$CH_3Si(OCH_2CH_3)_3$, and
$Si(OCH_2CH_3)_4$.

Polymers obtained by partial hydrolysis and condensation of these silanes may also be used. Good shelf-life in one package containers may also be obtained by addition of monovalent primary alcohols such as methanol or ethanol.

Further, it is possible to add agents which give the composition thixotropy such as hydrogenated castor oil or to add a plasticizer such as dioctylphthalate, butylbenzyl phthalate and chlorinated paraffin.

The composition of this invention can be used as a one-package type as described above, as well as a two-package type in which a portion comprising the ingredients (I) and (II), and a portion comprising the ingredient (III) are stored separately and mixed before use.

The composition of this invention has an adhesive property before curing, and the elastomer obtained after curing is excellent in heat resistance and weather resistance. Further the cured elastomer has no residual surface tackiness, and no soiling occurs due to the deposition of dust. Thus the composition is suitable for use as a sealant requiring weather resistance such as for joints of building outer walls, or requiring heat resistance such as joining parts of transportation machines, etc. exposed to relatively high temperature.

EXAMPLES OF THE INVENTION

This invention will now be described more specifically by way of samples, in which all parts are parts by weight and "%" means "% by weight".

EXAMPLE 1

To 5 moles (10 epoxy gram equivalent) of polyoxypropylene end-blocked with glycidyl groups having an average polymerization degree of 15, molecular weight of about 1000 and viscosity at 25° C. of 270 cSt, were added 6 moles of 2,5-dimercapto-1,3,4-thiadiazole represented by:

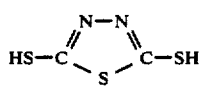

and methanol in an amount of 10% to the polyosypropylene. The reaction was started by stirring and heating at 60° C. in a nitrogen atmosphere. The reactor content was sampled at 4 hour intervals for conducting NMR observation of the proton peak of epoxide methylene (2.67 ppm based on tetramethyl silane) and for measurement of the viscosity at 25° C. After 12 hours from the start of heating under stirring, the proton peak of the epoxide methylene disappeared and the viscosity which had been 100 cSt at start reached 1,800 cSt. Subsequently 2.2 moles of

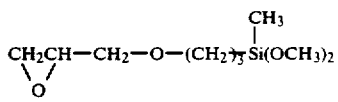

were added and heating with stirring was continued under the same conditions. The reaction mixture was again sampled at 4 hour intervals after adding the silane. The mercapto group was determined by adding iodine for reaction with the mercapto group and conducting back titration for the remaining iodine with sodium thiosulfate. The mercapto group was no longer detected 12 hours after the addition of silane. As a result, the reaction was stopped and methanol was stripped off. The resultant reaction product was a pale yellow viscous liquid polyether having a viscosity at 25° C. of 19,000 cSt, specific gravity at that temperature of 1.01 and a number average molecular weight measured by GPC of 6,500. This polyether, P-1, is end-blocked with hydrolyzable silyl groups and represented by the following formula.

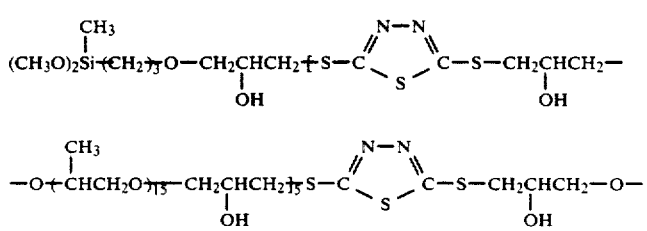

-continued

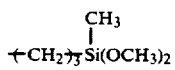

EXAMPLE 2

To 5 moles (10 epoxy gram equivalent) of polyosypropylene end-blocked with glycidyl groups having an average polymerization degree of 32, molecular weight of about 2000 and viscosity at 25° C. of 550 cSt, were added 6 moles of 2,5-dimercapto-1,3,4-thiadiazole and ethanol in an amount of 10% to the polyoxypropylene. The reaction was started by stirring and heating at 60° C. in a nitrogen atmosphere. The reactor content was sampled at 4 hour intervals for conducting NMR observation of the proton peak of epoxide methylene and for measurement of the viscosity at 25° C. After 12 hours from the start of heating under stirring, the proton peak of the epoxide methylene disappeared and the viscosity which had been 270 cSt at start reached 4,400 cSt. Subsequently 2.2 moles of

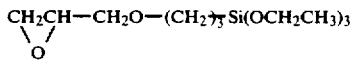

were added and heating with stirring was continued under the same conditions. The reaction mixture was again sampled at 4 hour intervals after adding the silane. The mercapto group was determined by the same method as in Example 1. Since the mercapto group was no longer detected 12 hours after the addition of silane, the reaction was stopped and ethanol was stripped off. The product was a pale yellow viscous liquid polyether having a viscosity at 25° C. of 29,000 cSt, specific gravity at that temperature of 1.01 and a number average molecular weight measured by GPC of 11,000. This polyether, P-2, is end-blocked with hydrolyzable silyl groups and represented by the following formula.

average polymerization degree of 50, molecular weight of about 3000 and viscosity at 25° C. of 970 cSt, were added 4 moles of 2,5-demercapto-1,3,4-thiadiazole and methanol in an amount of 10% to the polyosypropylene. The reaction was started by stirring and heating at 60° C. in a nitrogen atmosphere. The reactor content was sampled at 4 hour intervals for conducting NMR observation of the proton peak of epoxide methylene and for measurement of the viscosity at 25° C. After 16 hours from the start of heating under stirring, the proton peak of the epoxide methylene disappeared and the viscosity which had been 420 cSt, at start reached 5,400 cSt. Subsequently 2.2 moles of

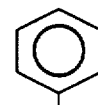
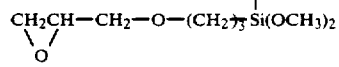

were added and heating with stirring was continued under the same conditions. The reaction mixture was sampled at 4 hour intervals after adding the silane. The mercapto group was determined by the same method as in Example 1. Since the mercapto group was no longer detected 16 hours after the addition of silane, the reaction was stopped and methanol was stripped off. The product was a pale yellow viscous liquid polyether having a viscosity at 25° C. of 26,000 cSt, specific gravity at that temperature of 1.01 and a number average molecular weight measured by GPC of 9,500. This polyether, P-3, is end-blocked with hydrolyzable silyl groups and represented by the following formula.

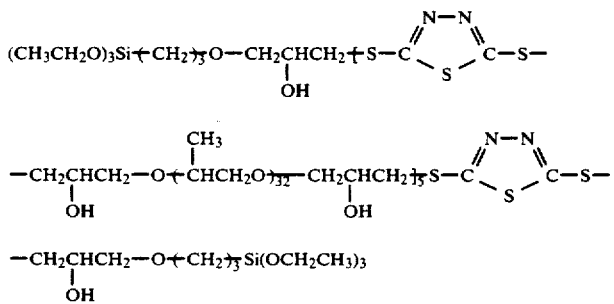

EXAMPLE 3

To 3 moles (6 epoxy gram equivalent) of polyoxypropylene end-blocked with glycidyl groups having an

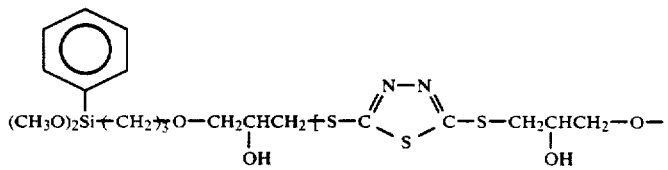

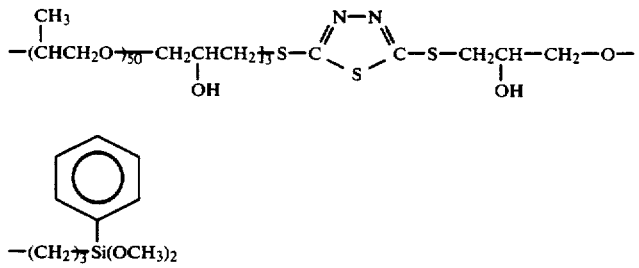

—(CH$_2$)$_3$Si(OCH$_3$)$_2$

EXAMPLE 4

To 3 moles (6 epoxy gram equivalent) of the same polyoxypropylene end-blocked with glycidyl groups having an average polymerization degree of 50, molecular weight of about 3000 and viscosity at 25° C. of 970 cSt as used in Example 3, were added 4 moles of p-dimercaptobenzene represented by:

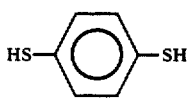

and methanol in an amount of 10% to the polyoxypropylene. The reaction was started by stirring and heating at 60° C. in a nitrogen atmosphere. The reactor content was sampled at 4 hour intervals for conducting NMR observation of the proton peak of epoxide methylene and for measurement of the viscosity at 25° C. After 12 hours from the start of heating under stirring, the proton peak of the epoxide methylene disappeared and the viscosity which had been 400 cSt at start reached 5,200 cSt. Subsequently 2.2 moles of methyl(γ-glycidoxypropyl) dimethyloxysilane were added and heating with stirring was continued under the same conditions. The reaction mixture was sampled at 4 hour intervals after adding the silane. The mercapto group was determined by the same method as in Example 1. Since the mercapto group was no longer detected 12 hours after the addition of silane, the reaction was stopped and methanol was stripped off. The product was a pale yellow viscous liquid polyether having a viscosity at 25° C. of 25,000 cSt, specific gravity at that temperature of 1.01 and a number average molecular weight measured by GPC of 9,500. This polyether, P-4, is end-blocked with hydrolyzable silyl groups and represented by the following formula.

EXAMPLE 5

To 3 moles (6 epoxy gram equivalent) of the same polyoxypropylene end-blocked with glycidyl groups having an average polymerization degree of 50, molecular weight of about 3000 and viscosity at 25° C. of 970 cSt as used in Example 3, were added 4 moles of 1,5-dimercaptonaphthalene represented by

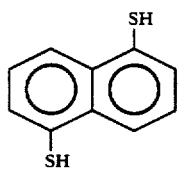

and methanol in an amount of 10% to the polyoxypropylene. The reaction was started by stirring and heating at 60° C. in a nitrogen atmosphere. The reactor content was sampled at 4 hour intervals for conducting NMR observation of the proton peak of epoxide methylene and for measurement of the viscosity at 25° C. After 12 hours from the start of heating under stirring, the proton peak of the epoxide methylene disappeared and the viscosity which had been 430 cSt at start reached 5,500 cSt. Subsequently 2.2 moles of methyl(γ-glycidoxypropyl) dimethoxysilane were added and heating with stirring was continued under the same conditions. The reaction mixture was sampled at 4 hour intervals after adding the silane. The mercapto group was determined by the same method as in Example 1. Since the mercapto group was no longer detected 12 hours after the addition of silane, the reaction was stopped and methanol was stripped off. The product was a pale yellow viscous liquid polyether having a viscosity at 25° C. of 27,000 cSt, specific gravity at that temperature of 1.01 and a number average molecular weight measured by GPC of 9,600. This polyether, P-5, is end-blocked with hydrolyzable silyl groups and represented by the following formula.

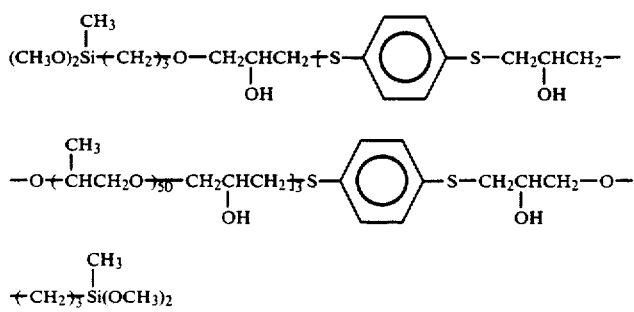

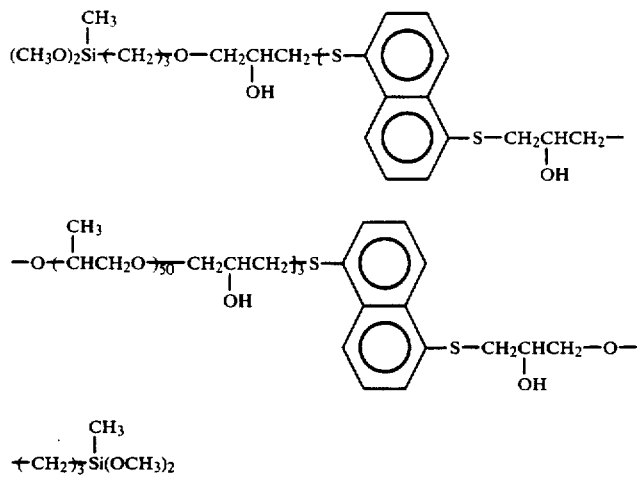

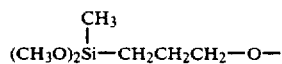

EXAMPLES 6-10

To 100 parts of polyethers (P-1 through P-5) end-blocked with hydrolyzable silyl groups prepared in Examples 1 through 5, were added fillers, inorganic pigments and thixotropy agents shown in Table 1. After dispersing the ingredients uniformly by a three roll mill, organo tin compounds shown in Table 1 were added and mixed with the composition to give the samples 1 through 5. These samples were cured at room temperature for 14 days to form 2 mm thick sheets. The sheets were cut into the shape of dumb-bell No. 2 test specimens as defined in JIS K 6301, and hardness and tensile strength were measured. The result was designated as initial state. Then, dumbbell test specimens obtained in the same manner were placed in a 150° C. oven, and a weatherometer. After subjecting the test specimens to aging conditions (heating or UV irradiation) for periods shown in Table 1, the physical condition of the specimens was observed and hardness and tensile strength were measured. The results are shown in Table 1.

COMPARATIVE EXAMPLE 1

To 100 parts of polyoxypropylene end-blocked with the group represented by:

$$(CH_3O)_2Si-CH_2CH_2CH_2-O-$$
$$\phantom{(CH_3O)_2S}|\phantom{i-CH_2CH_2CH_2-O-}$$
$$\phantom{(CH_3O)_2Si-}CH_3$$

and having a molecular weight of about 8,000, were added fillers, inorganic pigments and thixotropy agents shown in Table 1. After dispersing the ingredients uniformly by a three roll mill, organo tin compounds shown in Table 1 were added and mixed to give sample 6. Sample 6 was tested in the same manner as described in Examples 6 through 10. The results are shown in Table 1.

As can be seen from Table 1, the room temperature curable composition of this invention is superior to the composition using the conventional polymer described in Comparative Example 1 in terms of both heat resistance and UV resistance (weathering resistance).

EXAMPLES 11-15

Specimens for shear resistance test shown in FIG. 1 were prepared by curing the samples 1 through 5 prepared in Example 6 through 10 for 28 days at room temperature. Shear resistance was measured for these test specimens by a method similar to that of JIS K 6850. The results are shown in Table 2.

COMPARATIVE EXAMPLE 2

The same test as in Example 11 through 15 was conducted using sample 6 prepared in Comparative Example 1. The results are shown in Table 2.

As can be seen from Table 2 the room temperature curable composition of this invention has excellent adhesion.

| Sample No.<br>Polyether No. | | Example 6<br>Sample 1<br>P-1 | Example 7<br>Sample 2<br>P-2 | Example 8<br>Sample 3<br>P-3 | Example 9<br>Sample 4<br>P-4 | Example 10<br>Sample 5<br>P-5 | Comparative<br>Example 1<br>Sample 6<br>— |
|---|---|---|---|---|---|---|---|
| Filler<br>(parts) | Colloidal calcium carbonate treated with fatty acid | 50 | 50 | 50 | 50 | 50 | 50 |
| | Light calcium carbonate treated with fatty acid | 20 | — | 20 | 20 | 20 | 20 |
| | Heavy caldium carbonate | 30 | 50 | 30 | 30 | 30 | 30 |
| Pigment<br>(parts) | Titanium oxide | 10 | 10 | 10 | 10 | 10 | 10 |
| | Carbon black | 0.25 | 0.25 | 0.25 | 0.25 | 0.25 | 0.25 |
| Thixotropy agent<br>(parts)<br>Hydrogenated<br>castor oil | | 2 | 2 | 2 | 2 | 2 | 2 |
| Organo tin | Dibutyl tin oxide | 1 | — | 1 | 1 | 1 | 1 |

-continued

| Sample No. Polyether No. | | Example 6 Sample 1 P-1 | Example 7 Sample 2 P-2 | Example 8 Sample 3 P-3 | Example 9 Sample 4 P-4 | Example 10 Sample 5 P-5 | Comparative Example 1 Sample 6 — |
|---|---|---|---|---|---|---|---|
| compounds | Dibutyl tin dilaurate | — | 1 | — | — | — | — |
| Initial state (kgf/cm²) | Hardness | 16 | 24 | 18 | 16 | 17 | 16 |
| | Tensile strength | 14 | 21 | 16 | 15 | 14 | 16 |
| | Elongation (%) | 600 | 350 | 710 | 790 | 760 | 630 |
| 150° C. heating after 7 days | Aged state | no abnormality | no abnormality | no abnormality | no abnormality | no abnormality | notably brittle due to depolymerization |
| | Hardness | 14 | 22 | 16 | 20 | 19 | impossible to measure |
| | Tensile strength (kgf/cm²) | 16 | 18 | 19 | 18 | 16 | |
| | Elongation (%) | 630 | 420 | 760 | 630 | 620 | |
| UV rays irradiation after 3,000 hours | Aged state | no abnormality | no abnormality | no abnormality | no abnormality | no abnormality | cracking resulted |
| | Hardness | 17 | 25 | 19 | 18 | 19 | 6 |
| | Tensile strength (kgf/cm²) | 19 | 23 | 20 | 16 | 15 | 3 |
| | Elongation (%) | 580 | 320 | 700 | 720 | 690 | 170 |

TABLE 2

| Sample No. | | Example 11 Sample 1 | Example 12 Sample 2 | Example 13 Sample 3 | Example 14 Sample 4 | Example 15 Sample 5 | Comparative Example 2 Sample 6 |
|---|---|---|---|---|---|---|---|
| Glass | Shear resistance (kgf/cm²) | 9 | 12 | 10 | 8 | 9 | 3 |
| | Cohesive failure rate (%) | 100 | 100 | 100 | 100 | 100 | 0 |
| Aluminum | Shear resistance (kgf/cm²) | 8 | 14 | 9 | 10 | 11 | 3 |
| | Cohesive failure rate (%) | 100 | 100 | 100 | 100 | 100 | 0 |
| Polyvinyl chloride-coated steel plate | Shear resistance (kgf/cm²) | 11 | 12 | 11 | 9 | 10 | 2 |
| | Cohesive failure rate (%) | 100 | 100 | 100 | 100 | 100 | 0 |

What is claimed is:

1. A room temperature curable composition comprising:

(I) 100 parts by weight of a polyether having a number average molecular weight from 1,000 to 50,000, end-blocked with hydrolyzable silyl groups represented by the general formula:

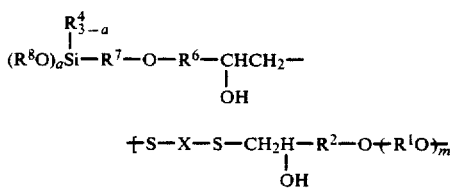

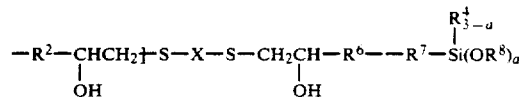

where $R^1$, $R^2$, $R^6$, and $R^7$ individually represent a divalent hydrocarbon group, $R^4$ represents a monovalent hydrocarbon group, $R^8$ represents an alkyl group with 1 to 6 carbon atoms, a represents a number from 1 to 3, m represents a number from 10 to 500, n represents a number of 1 or greater and X represents an aromatic or heterocyclic ring, (II) 3 to 300 parts by weight of an inorganic filler, and
(III) 0.001 to 20 parts by weight of a curing catalyst.

2. A composition as defined in claim 1, wherein $R^1$ is a propylene group.

3. A composition as defined in claim 1, wherein $R^8$ is a methyl group or ethyl group.

4. A composition as defined in claim 1, wherein a is 2.

5. A composition as defined in claim 1, wherein —S—X—S— is a dehydrogenated residue group of 2,5-dimercapto-1,3,4-thiadiazole.

* * * * *